United States Patent

Farnsworth et al.

[15] 3,641,422
[45] Feb. 8, 1972

[54] WIDE BAND BOOST REGULATOR POWER SUPPLY

[72] Inventors: Robert P. Farnsworth, 12612 Indianapolis, Los Angeles, Calif. 90066; Dennis G. McCaughey, 1244 Saltair Ave., Los Angeles, Calif. 90025

[22] Filed: Oct. 1, 1970

[21] Appl. No.: 77,168

Related U.S. Application Data

[63] Continuation-in-part of Ser. No. 884,858, Dec. 15, 1969, abandoned.

[52] U.S. Cl. ..................................323/8, 321/2, 323/17, 323/20, 323/22 T, 323/38, 323/DIG. 1
[51] Int. Cl. ............................................G05f 1/56, G05f 1/60
[58] Field of Search ..............321/2; 323/4, 8, 17, 20, 22 T, 323/22 SC, 38, 94 H, DIG. 1

[56] References Cited

UNITED STATES PATENTS

| 3,523,239 | 8/1970 | Heard | 323/20 |
|---|---|---|---|
| 3,327,202 | 6/1967 | Mills | 323/22 T |
| 3,381,202 | 4/1968 | Loucks et al. | 321/2 |
| 3,388,318 | 6/1968 | O'Brien | 323/20 |
| 3,473,049 | 10/1969 | Alexander | 323/DIG. 1 |

*Primary Examiner*—A. D. Pellinen
*Attorney*—James K. Haskell and Walter J. Adam

[57] ABSTRACT

A power supply which, in one embodiment, provides to a load a relatively constant DC (direct current) output voltage at a voltage level equal to or greater than that being supplied from a variable DC voltage source. The power supply includes a first switching circuit controlled by a voltage sensing circuit to allow energy to be transferred from a current storage device to a voltage storage device to maintain the amplitude of the output voltage within predetermined levels, and also includes a second switching circuit controlled by a current sensing circuit to allow the amplitude of circuit to be maintained within predetermined limits.

12 Claims, 9 Drawing Figures

WIDE BAND BOOST REGULATOR POWER SUPPLY

This is a Continuation-in-part of application, Ser. No. 884,858, filed Dec. 15, 1969, now abandoned. The invention herein described was made in the course of or under a contract with the United States Army.

BACKGROUND OF THE INVENTION

This invention relates to power supplies and particularly to a wide band boost regulator power supply.

Conventional regulator power supplies are of three types. One type is a high efficiency regulator which provides an output voltage equal to or less than the input voltage. This type of supply is unusable where the input voltage is less than the desired output voltage. A second type is the direct current to direct current (DC—DC) converter for providing an unregulated output voltage which is related to the input voltage by some fixed ratio. The third type is a boost regulator which regulates the output voltage at a higher level than the input voltage. However, changes or transients in the input or output circuits require appreciable time for recovery and result in output transients from the regulator. The inherent response of the regulator control loop must of necessity be limited for stable operation.

None of the prior art systems previously discussed provide both a voltage increase and wide bandwidth or rapid loop control type of regulation.

SUMMARY OF THE INVENTION

Briefly, an improved wide band boost regulator power supply is provided which utilizes a voltage sensing circuit to allow a constant current source to increase the output voltage when the output voltage is low and to prevent any further increase in the output voltage beyond a predetermined level by bypassing the constant current source back to itself when the output voltage has reached or exceeded the predetermined voltage level. The constant current source utilized in this invention includes a current sensing circuit coupled to an inductive device to control the operation of a switching circuit as a function of the amplitude of the current in order to maintain the level of the current within predetermined limits.

It is therefore an object of this invention to provide an improved wide band boost regulator power supply.

Another object of this invention is to provide a power supply for developing a relatively constant DC voltage from a variable DC source by a highly efficient means.

Another object of this invention is to provide a power supply which increases the voltage supplied by a variable DC source so as to provide a constant output voltage which is at all times equal to or greater than the input voltage.

Another object of this invention is to provide a regulated power supply which produces a constant output voltage while preventing significant variations in the output voltage due to transient load or input changes.

A further object of this invention is to provide a regulated power supply which produces a plurality of different output voltages isolated from the input power source.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein:

FIG. 5 is a schematic circuit diagram of the power supply in accordance with the second embodiment of this invention.

DETAILED DESCRIPTION OF THE PREFERRED EMBODIMENTS

Figure 1:
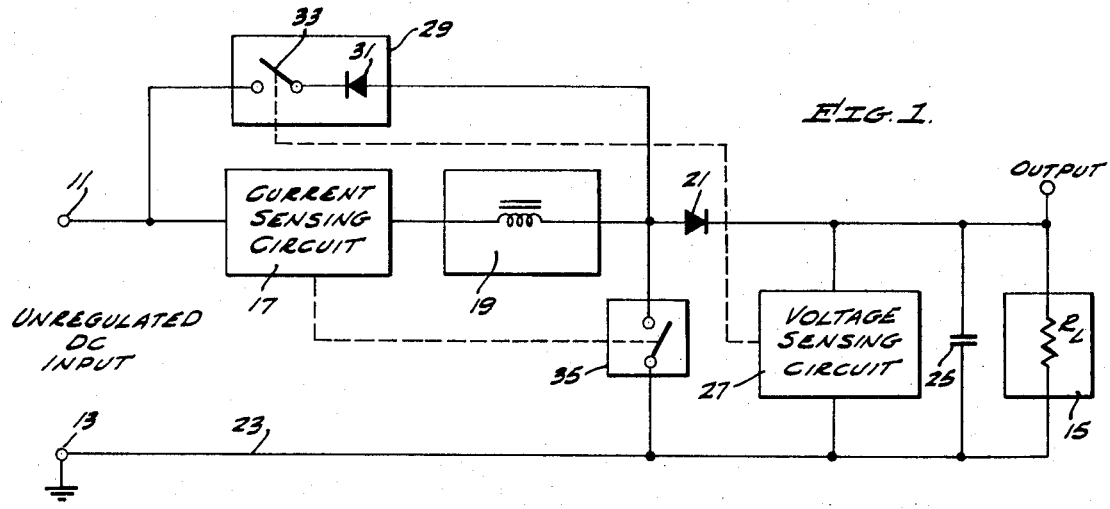
FIG. 1 is a schematic circuit and block diagram of the regulated power supply in accordance with one embodiment of this invention.

Referring now to the drawings, FIG. 1 illustrates a schematic circuit and block diagram in accordance with one embodiment of the invention. The embodiment of FIG. 1 can best be explained by also referring to FIGS. 2 and 3. In the mechanization of the power supply of FIG. 1 an anticipated low voltage extreme of the input and output operating conditions was taken into consideration in order to provide a substantially transient free regulation during expected input voltage transients which may lower a nominal +24-volt input applied between a terminal 11 and a grounded terminal 13 to, for example, 6 volts for up to 100 milliseconds or even longer. Furthermore, this invention will also maintain regulation of the output voltage during the time that these expected transients increase the nominal +24-volt input up to as high as +26.7 volts, for example. Any deviations below or above this nominal +24-volt level could be caused by line or load voltage transients. The circuit of FIG. 1 is therefore designed so that with an input under +6 volts, which is the lowest anticipated operating condition encountered for this particular use, the current being supplied to the load 15 would be approximately 2 amperes, which is the current required by the load 15 for normal operation. Furthermore, the output voltage will regulate within a selected range, for example, of from +24 to +26 volts throughout the expected input voltage range of from +6 volts to +26.7 volts. It should be understood that the invention is also applicable to a negative voltage power supply or to other operating conditions by proper design considerations, such as changing the location or size of components.

In operation, unregulated voltage at a nominal level of, for example, +24 volts is applied from an unregulated voltage source (not shown) to the input terminals 11 and 13 of the power supply of this invention. This unregulated voltage source supplies power via a charging current through a serially coupled combination consisting of a current sensing circuit 17, a constant current source or inductor 19, and a diode 21 to the load 15, which may include a resistor $R_L$. The other side of the load 15 is returned to the terminal 13 through a ground lead 23. A capacitor 25 is coupled in parallel with the load 15 to absorb fluctuations or changes in the charging current applied to the load 15 in order to allow a constant power to be delivered to the load 15.

A voltage sensing circuit 27, coupled across the capacitor 25 in order to sense the output voltage, controls the operation of a switch or switching circuit 29 in response to the sensed output voltage. The switch 29, which is coupled across the serially coupled current sensing circuit 17 and inductor 19 combination, is closed by the voltage sensing circuit 27 when the output voltage equals or exceeds an upper limit $E_2$ (FIG. 2) of, for example, +26 volts and is opened by the voltage sensing circuit 27 when the output voltage decreases to or below a lower limit $E_1$ (FIG. 2) of, for example, +24 volts. The switch 29 is designed to only allow a unidirectional flow of current therethrough. For this reason the switch 29 is illustrated in FIG. 1 as including a diode 31 coupled in series with a set of contacts 33.

The current sensing circuit 17 senses the current through the inductor 19 and in response thereto controls the operation of a second switch or switching circuit 35, which is coupled between the ground lead 23 and the junction of the inductor 19 and the anode of the diode 21. When the current through the inductor 19 is equal to or below a first current level $I_1$ (FIG. 3) of 10 amperes, for example, the current sensing circuit 17 closes the switch 35. The closure of the switch 35 reverse-biases the diode 21 to prevent the capacitor 25 from discharging through the closed switch 35, reverse-biases the diode 31 to disable the switch 29, and provides a low impedance direct current (DC) return path to the input terminal 13 in order to allow the current through the inductor 19 to build up to a second current level $I_2$ (FIG. 3) of, for example, 12 amperes. When the current through the inductor 19 reaches or exceeds this second current level $I_2$, the current sensing circuit 17 opens the switch 35. The opening of the switch 35 removes the low impedance return path to the input terminal 13 to prevent any further increase in the inductive current, forward-biases the diode 31 to enable the switch 29, and, if the set of contacts 33 of the switch 29 is open, forward-biases the diode 21 in order to allow power to again be applied to the load 15. During the period of time that the switch 35 is closed, the discharge of the capacitor 25 supplies power to the load 15. During the period of time that the switch 35 is open, the excess in charging current being applied to the load 15 charges the capacitor 25 so that the output voltage is regulated between the lower and upper limits of +24 volts and +26 volts, respectively.

In initial operation when the nominal +24 volt input is first applied to the power supply, the switch 29 is open due to the low output voltage sensed by the voltage sensing circuit 27, and the switch 35 is closed due to the low inductor 19 current sensed by the current sensing circuit 17. As previously described, the closure of the switch 35 reverse-biases the diodes 21 and 31, by grounding their anodes, in order to prevent any power from being delivered to the load 15 from the inductor 19 while the current through the inductor 19 is increasing to the $I_2$ level of 12 amperes.

Figure 3:
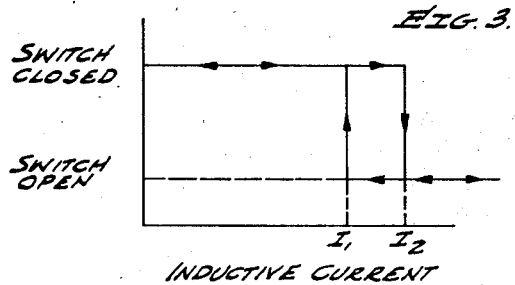
FIG. 3 is a graph which illustrates the response characteristics of the switching circuit controlled by the current sensing circuit of FIGS. 1, 4 or 9.

As illustrated in FIG. 3, with the closure of switch 35, the current flowing through the inductor 19 starts building up according to a linear ramp, which is determined by the inductance of the inductor 19 and the amplitude of the DC input voltage. This linear increase of current through the inductor 19 in relation to time causes a corresponding increase in the current that is sensed by the current sensing circuit 17. When the current sensing circuit 17 senses that the current flowing through the inductor 19 has reached the upper level $I_2$, as shown in FIG. 3, the current sensing circuit 17 causes the switch 35 to open. The opening of switch 35 interrupts the buildup of current through the inductor 19, causing the magnetic field or flux that had been built up around the inductor 19 to start to collapse. This collapsing magnetic field cuts across the inductor 19 and induces thereacross a back electromotive force (EMF) or voltage which has a polarity that is series-aiding with the +24 volt input and tends to keep current flowing in the same direction through the inductor 19. With the opening of the switch 35, the diodes 21 and 31 become forward-biased and current starts flowing in the load 15 through the diode 21.

Since the input, as specified before, is at a nominal +24 volts, there is a very small and negligible voltage drop across the inductor 19. Therefore the flux in the inductor 19 changes very slowly, the current decays very slowly, and most of the power being supplied to the load 15 and capacitor 25 is supplied from the unregulated voltage source coupled to the input terminals 11 and 13. The current being supplied to the parallel-coupled load 15 and capacitor 25 after the current sensing circuit 17 opens the switch 35 is initially about 12 amperes. The current required by the load 15 is based upon the voltage drop across the capacitor 25 and the impedance of the load 15. At the time of the initial turn-on no voltage was developed across the capacitor. Since at this time the load 15 does not require any current, the current being supplied starts charging the capacitor 25. As the capacitor 25 charges, the load 15 starts requiring current, but not at the amplitude being supplied to the parallel-coupled load 15 and capacitor 25. Even during normal operation the current required by the load 15 is approximately 2 amperes. Therefore, current is being supplied faster than the load 15 can absorb it. As a result, the voltage across the capacitor 25 starts increasing due to this charging current.

When the charging current charges the capacitor 25 to or above the +26 volt level, the voltage sensing circuit 27 causes the switch 29 to close. When the switch 29 closes, the current through the inductor 19 circulates through itself via the switch 29 in order to prevent any further increase in the output voltage. The capacitor 25 then starts to slowly discharge through the load 15. When the output voltage, as sensed by the voltage sensing circuit 27, decreases to or below the +24-volt level, the voltage sensing circuit 27 opens the switching circuit 29 to enable the capacitor 25 to be recharged to the +26-volt level.

In normal operation, whenever the unregulated input voltage being applied between the terminals 11 and 13 is low enough to drop the output voltage to or below +24 volts, the cycle will repeat itself with the output voltage varying between the +24-volt and +26-volt limits. However, the average output voltage does not change during this cycling operation, although there is a sawtooth, or ripple voltage, on the output which varies between the +24-volt and +26-volt limits. It should be noted at this time that the frequency of cycling as well as the range of the voltage limits could be changed, if a different operation is desired, by changing the values of the components to vary the circuit parameters. For example, a decrease in the operational limits of the voltage sensing circuit 27 will increase the ripple frequency and decrease the amplitude of the output ripple, whereas a decrease in the value of the capacitor 25 will increase the ripple frequency but not affect the amplitude of the output ripple.

In another operational condition, there will be no cycling operation, and hence no ripple, whenever the output voltage is prevented from going below +24 volts. This condition occurs whenever the level of the input voltage remains within the range of +24.7 volts to +26.7 volts. Within this range the output voltage will stabilize at a voltage level equal to the input voltage minus the voltage drop across the diode 21, which is approximately 0.7 volt.

Assuming, after normal operation is achieved, a transient voltage drops the input voltage between terminals 11 and 13 to a +6 volt level. At this time the circuit could be in any one of four states of operation. These four states of operation will now be discussed.

In the first state, assume that the switches 29 and 35 are both open when the transient voltage occurs. The current through the inductor 19 starts decreasing since it is flowing through the diode 21 into the load 15. Since the current flowing from the inductor 19 is greater than 10 amperes the output voltage is increasing at this time. With the output voltage increasing, the switch 29 remains open until the output voltage reaches the upper limit of +26 volts, at which time the switch 29 closes and bypasses the inductor 19 back to itself. In the event that the current through the inductor, as sensed by the current sensing circuit 17, decreases to the level $I_1$ of FIG. 3 before the output voltage has increased to the upper limit of +26 volts, the switch 35 is closed by the current sensing circuit 17, and the current through the inductor 19 starts increasing until it reaches the $I_2$ level. At this time the current sensing circuit 17 opens the switch 35, thereby allowing the current through the inductor 19 to continue charging the capacitor 25 to the upper limit of +26 volts.

In the second state, assume that the switch 29 is open and the switch 35 is closed when the transient voltage occurs. At this time, the diodes 21 and 31 are both reverse-biased, there is no current from the inductor 19 flowing into the output, and the capacitor 25 is slowly discharging through the load 15. The current in the inductor 19 is increasing from 10 to 12 amperes, but at a slower rate since the input voltage has been reduced to +6 volts by the transient. When the current through the inductor 19 reaches the $I_2$ level of 21 amperes, the current sensing circuit 17 causes the switch 35 to open. At this time the power supply reverts to the first state of operation, which allows the inductor 19 to deliver a charging current to the capacitor 25 to increase the output voltage to the +26 volt limit.

In the third state, assume that the switch 29 is closed and the switch 35 is open when the transient voltage occurs. The current through the inductor 19 is circulated back to itself through the switch 29. The output voltage is decreasing at this time not because of the transient voltage but because the closure of the switch 29 allows the capacitor 25 to discharge through the load 15. Therefore, the transient voltage has no effect at all on the output voltage during this operation. With the output voltage decreasing, the switch 29 remains closed until the output voltage decreases to a +24 volts, at which time the voltage sensing circuit 27 causes the switch 29 to open. Since at this time both of the switches 29 and 35 are open, the inductor 19 starts delivering a charging current to the load 15 and to the capacitor 25, as previously discussed in the operation for the first state.

In the fourth state, assume that the switches 29 and 35 are both closed when the transient voltage occurs. The closure of the switch 35 reverse-biases the diodes 21 and 31, thereby preventing the current in the inductor 19 from flowing either through the now closed set of contacts 33 of the switch 29 or through the load 15. The current through the inductor 19 is in the process of increasing from the $I_1$ level to the $I_2$ level, as shown in FIG. 3. Capacitor 25 is also slowly discharging through the load 15. If the current through the inductor 19 increases to 12 amperes before the output voltage drops below +24 volts, the current sensing circuit 17 causes the switch 35 to open and the subsequent operation is the same as described for the third state. If, however, the output voltage decreases below +24 volts before the current through the inductor 19 increases to the $I_2$ level, the switch 29 opens and the subsequent operation is the same as that described in relation to the second state. Furthermore, if the current through the inductor 19 reaches the $I_2$ level at the same time that the output voltage drops below +24 volts, both of the switches 29 and 35 open and the subsequent operation is the same as that described in relation to the first state.

If in operation the transient is present at the input terminals 11 and 13 for an indefinite period of time, the current through the inductor 19 builds up the $I_2$ level of 12 amperes and the subsequent opening of switch 35 by the current sensing circuit 17 allows the capacitor 25 to be recharged before there is an appreciable drop in the output. This system therefore provides transient-free protection at an output voltage level between the +24-volt and +26-volt limits as long as the input voltage is in the range from +6 volts to +26.7 volts. Furthermore, since the circuit of FIG. 1 reacts instantaneously, there is no transient recovery period.

Figure 4:
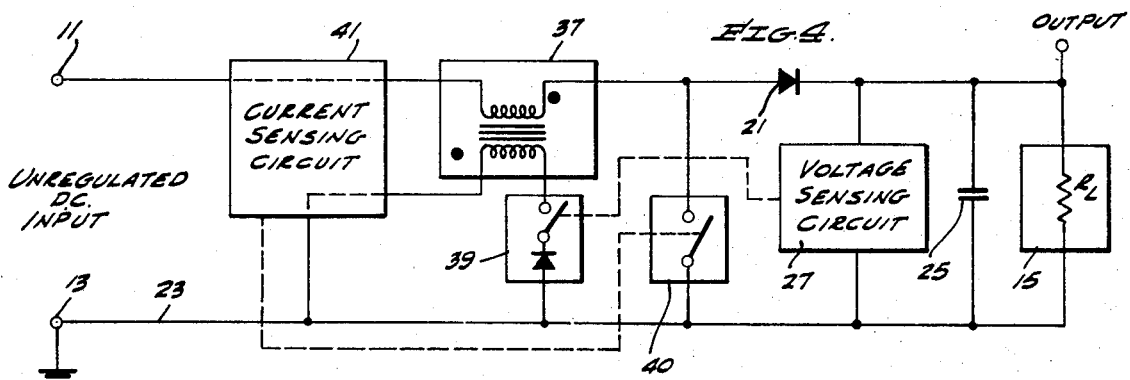
FIG. 4 is a schematic circuit and block diagram of the regulated power supply in accordance with a second embodiment of this invention.

Referring now to FIG. 4, a second embodiment of the invention is illustrated. In this embodiment a transformer 37 is utilized in place of the inductor 19 of FIG. 1 with a switching circuit or switch 39, corresponding to the switch 29, being placed in series with the secondary winding of the transformer 37. A switching circuit or switch 40, similar to the switch 35 of FIG. 1, is serially coupled between the primary winding of the transformer 37 and the ground lead 23. A current sensing circuit 41 which will be described in more detail later, senses the flux in both windings of the transformer 37. Since the flux is dependent upon the ampere-turns of both windings of the transformer 37, with the turns ratio of the transformer being fixed, the current sensing circuit 41 will sense the current in the transformer 37 because the currents in both windings affect the flux coupling the windings. The remaining components of FIG. 4 may be identical to their equivalent components in FIG. 1 and therefore have the same reference numerals as their equivalents in FIG. 1.

Figure 2:
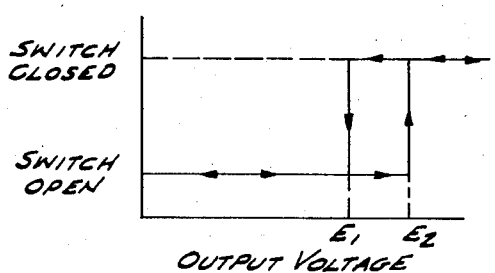
FIG. 2 is a graph which illustrates the response characteristics of the switching circuit controlled by the voltage sensing circuit of FIGS. 1, 4 or 9.

In operation the voltage sensing circuit 27 controls the operation of the switching circuit 39 and the current sensing circuit 41 controls the operation of the switching circuit 40 in the same manner as described in relation to FIG. 1. The waveforms shown in FIGS. 2 and 3 are equally applicable to the second embodiment as shown in FIG. 4.

A more detailed explanation of the operation of the embodiment of FIG. 4 will now be given by referring to FIG. 5. The embodiment of FIG. 5 utilizes a Hall generator or Hall device similar to the HS–51 Halltron, which is manufactured by Ohio Semiconductors Incorporated and described and illustrated in its publication on the Halltron HS–51. The Hall generator 101 is a device which is based upon the Hall effect, which in turn arises when a conducting material is placed in a magnetic field perpendicular to the direction of the current flow, thereby developing a voltage across the material in a direction perpendicular to both the magnetic field and the current. This voltage is called the Hall voltage and is proportional to the instantaneous product of the magnetic field and the current passing through the element. The Hall device 101 is placed in the core of transformer 37 and senses the amount of current passing through both of the primary and secondary windings of the transformer 37 by sensing the amount of flux or magnetic field in the transformer 37. The transformer 37 is wound to have a phase reversal as indicated by the black dots between the primary and secondary windings and has a fixed turns ratio between these windings. The flux being sensed is proportional to the total ampere turns. However, the turns ratio of the transformer 37 is fixed. Therefore the flux being sensed is proportional to the amperes flowing in both of the primary and secondary windings, since both contribute to the total flux being sensed.

Figure 5:
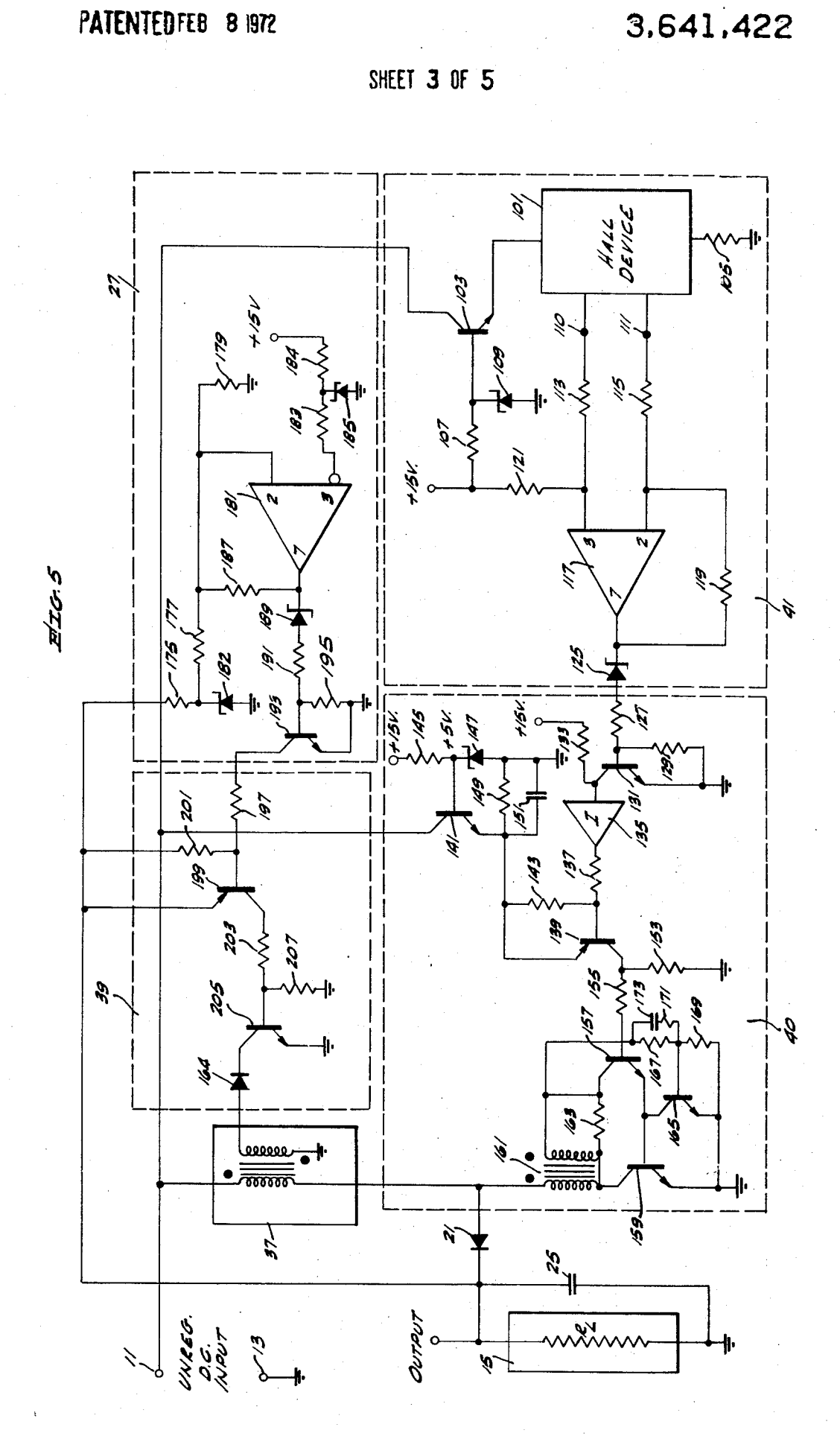

More specifically, an unregulated input voltage at a nominal +24-volt level, but which may vary from +6 to +26.7 volts, is applied between the input terminals 11 and 13 of the power supply of FIG. 5. The terminal 13 is placed at a reference potential or ground in order to provide a DC return path. The input terminal 11 is connected to the collector of an NPN-transistor 103 in the current sensing circuit 41. The transistor 103 has its emitter coupled through the Hall device 101 and through a resistor 105 to ground in order to supply a control current to the Hall device 101. The base of the transistor 103 is coupled through resistor 107 to a source of potential of, for example, +15 volts. A zener diode 109 is connected between the base of transistor 103 and the reference potential in order to stabilize the base to ground potential for the transistor 103 so that a constant control current will flow through the transistor 103, the Hall device 101, and the resistor 105 to ground. Since the emitter current of transistor 103 supplies a constant control current to the Hall device 101 and since the Hall device is mounted in the core of the transformer 37, the Hall device will generate a Hall voltage which, as mentioned before, is proportional to the instantaneous product of the magnetic field and the control current passing through the Hall device 101. Since the control current is held constant the Hall voltage appearing at the output terminals 110 and 111 is proportional to the flux that intercepts the surface of the Hall device 101. The output terminals 110 and 111 of the Hall device 101 are respectively coupled through resistors 113 and 115 to inverting and noninverting terminals 3 and 2, respectively, of a comparator 117. The comparator 117 may be a Fairchild μA710, High Speed Comparator, manufactured by Fairchild Semiconductor Corporation and described and illustrated in its handbook, Fairchild Semiconductor Linear Integrated Circuits, Application Handbook. A resistor 119 is coupled between the input terminal 2 and output terminal 7 of the comparator 117 and operates, in conjunction with the resistor 115, to form a positive feedback for the current sensing. This positive feedback allows the current sensing circuit 41 to turn on the switching circuit 40 when the current being sensed by the current sensing circuit 41 drops to or below 10 amperes and to not turn the switching circuit 40 off again until the current being sensed equals or exceeds 12 amperes.

The resistor 121 is coupled between the input terminal 3 of the comparator 117 and the +15 volt source so that the voltage drop across the resistor 113 will represent the amount of the nominal current desired in the sensing circuit. The values of the resistors 113, 115, 119 and 121 are determined by the characteristics of the Hall device 101 in a particular design and also by the way the Hall device is inserted into the transformer 37.

The comparator 117, which receives the Hall voltage developed at the terminals 110 and 111 of the Hall device 101 at its input pins 3 and 2, will develop a voltage at its output pin 7 which indicates whether the current being sensed is high or low. If the current being sensed by the sensing circuit 41 is at or below the $I_1$ level of 10 amperes, the voltage at output pin 7 of the comparator 117 will be in a low or negative voltage state, which causes the switching circuit 40 to be turned on. In order for the comparator 117 to produce a negative voltage at its output pin 7, the voltage at its pin 2 with respect to ground must be less than the voltage at its pin 3 with respect to ground. Under these conditions the negative voltage at output pin 7 of the comparator 117 will not couple through zener diode 125 into the switching circuit 35, since zener diode 125 will be rendered nonconductive by this negative output voltage.

The anode of the zener diode 125 is coupled to ground through serially connected resistors 127 and 129, which are located in the switching circuit 40. An NPN-transistor 131 has its emitter base region connected between ground and the junction of the resistors 127 and 129. Since the zener diode 125 is rendered nonconductive under low sensed current conditions, there will be no current flow flowing through the resistors 127 and 129. Therefore, the transistor 131 will be in a cutoff condition and its collector, which is returned through a resistor 133 to the +15-volt source, will be at a high positive voltage or logical one state. This logical one state is applied to the inverter 135 which develops a logical zero or low voltage level at its output in response to the logical one state signal at its input. This low output voltage level is applied through resistor 137 to the base of PNP-transistor 139. The emitter of the transistor 139 is connected directly to the emitter of transistor 141, which is connected as an emitter-follower and forms a part of a low voltage regulator for maintaining the emitter of transistor 139 at a constant potential of, for example, 5 volts. The base of the transistor 139 is biased by the voltage applied from the emitter of transistor 141 through a resistor 143. The collector of the low voltage regulator transistor 141 is coupled to the input terminal 11 and receives the unregulated input voltage therefrom. For receiving the proper bias, the base of the transistor 141 is connected to the junction of serially connected resistor 145 and zener diode 147 which are respectively connected between the +15-volt source and ground. The emitter of transistor 141 is returned to ground through bleeder resistor 149. A capacitor 151 is coupled across the bleeder resistor 149 in order to stabilize the 5-volt output at the emitter of transistor 141. The base potential of the transistor 141 is regulated at a +5-volt level due to the zener diode 147. As a result the emitter of transistor 141 holds the emitter of the transistor 139 at a +5-volt level. Therefore the output of the transistor 139 is directly dependent upon the state of the output of the inverter 135.

Since the output of the inverter 135 is at a low voltage level or logical zero state under low current conditions, the PNP-transistor 139 conducts through its collector load resistor 153 to ground developing an output signal at a high voltage level or logical one state. The collector voltage of transistor 139 is applied through resistor 155 to the base of transistor 157. The transistor 157, in conjunction with transistor 159, operates as a Darlington-connected stage in that the collectors of the transistors 157 and 159 are connected together through the secondary winding of transformer 161. A resistor 163 is coupled across the secondary of the transformer 161 and between the collectors of the transistors 157 and 159 in order to protect the transistor 157 from damage from transient voltage during the cutoff of transistor 157, which will be discussed later.

The high level signal, that is applied from the collector of the transistor 139 through resistor 155 to the base of the transistor 157, causes the transistor 157 to start conducting. The conduction of the transistor 157 supplies current from the collector of transistor 157 into the base of transistor 159, causing transistor 159 to start conducting. Upon the conduction of transistor 159, current flows from the input terminal 11 through the primary of transformer 37, through the primary of transformer 161, and through the collector emitter region of the transistor 159 to ground. The conduction of current through the primary of the transformer 161 causes a smaller current to flow through the secondary of the transformer 161, since the transformer 161 may have a turns ratio of 1 to 10, for example. With this turns ratio a current of 10 amperes flowing through the primary of the transformer 161 will cause 1 ampere of current to flow or to circulate in the secondary of the transformer 161. If the base current of the transistor 159 is one-tenth of the collector current of the transistor 159, then the transistor 157 will be in a saturated condition. With transistor 159 conducting at saturation, the collector of the transistor 159 is effectively placed at DC ground potential. The voltage drop across the primary of transformer 161 is negligible, since it is on the order of a few tenths of a volt. For this reason the bottom end of the primary of the transformer 37 is essentially grounded, thereby reverse-biasing the diode 21 to prevent the capacitor 25 from discharging through the transistor 159.

Since the top end of the primary of the transformer 37 is connected to the input terminal 11, it is at the nominal 24-volt level and current starts building up in the primary of the transformer 37. As the current is building up through the primary of the transformer 37 a voltage is induced in the secondary of the transformer. The transformer is wound to have a phase reversal across the secondary, such that the induced voltage across the secondary reverse-biases diode 164, thereby preventing any current from flowing or circulating in the secondary of the transformer 37. As a result, the primary current consists of a linear ramp or linear increase of current with respect to time, which is determined by the inductance of the primary of the transformer 37 and the amplitude of the DC input voltage. This linear increase of current with respect to time also causes the flux to increase in the core of the transformer 37 in a linear fashion.

When the current flowing through the primary of the transformer 37 has built up to or above the upper $I_2$ limit of 12 amperes, the flux sensed by the Hall device 101 reaches the upper level. The Hall device 101 then produces an output voltage at its terminals 110 and 111 such that, with respect to ground, the voltage at pin 3 of the comparator 117 is lower than the voltage at pin 2 of the comparator 117. Therefore, the voltage at output pin 7 of the comparator 117 becomes sufficiently high to cause the zener diode 125 to conduct through the resistor 127 and the base emitter region of the transistor 131 to ground, thereby causing the transistor 131 to start conducting. The conduction of the transistor 131 effectively places its collector and the input to the inverter 135 at a ground potential or a logical zero state. This logical zero state causes the output of the inverter 135 to go to a high voltage state or a logical one state, which cuts off the transistor 139. The cutoff of the transistor 139 removes the drive to the transistor 157. As transistor 157 starts to cut off, the voltage at its collector begins to rise. Before the drive to the transistor 157 was removed, the transistor 157 was in a charge-storage condition, which means that it was being overdriven beyond the normal saturation point. Therefore as the transistor 157 starts to cut off, it can still supply drive to the transistor 159 while it is beginning to cut off.

To shorten the turnoff time of the transistor 159, the collector-emitter region of a transistor 165 is connected across the base-emitter region of the transistor 159. A series-parallel network, consisting of resistors 167, 169, 171 and capacitor 173, is coupled between the collector of transistor 157 and ground with the junction of the resistors 167 and 169 being connected to the base of transistor 165 for controlling the operation of this transistor.

As the transistor 157 starts to cut off, its collector voltage starts to increase. This increase in collector voltage is capacitively coupled through capacitor 173 and resistor 171 to the base of the transistor 165 in order to provide the turn-on drive to the transistor 165. The transistor 165 then starts conducting, thereby providing a shunt path across the base-emitter region of the transistor 159 in order to remove the stored base charge in the transistor 159 and provide more rapid turnoff of the transistor 159. As soon as the transistor 159 cuts off, the current flowing through the primary of the transformer 37 is prevented from flowing through the primary of the transformer 161. The inductive effect of the transformer 37 causes the magnetic filed, which had been built up by the current flowing through the primary of the transformer 37, to collapse and induce a back electromotive force (EMF) across the primary which tends to keep the current flowing in the same direction as it had before. This back EMF forward biases the diode 21 which then provides a path for current from the primary of the transformer 37 to charge the capacitor 25 and deliver power to the load 15. This current being supplied to the load 15 and capacitor 25 is in the form of pulses. As a result, the capacitor 25 is used to absorb the fluctuation and allow a constant power to be delivered to the load 15.

Since under normal conditions the input voltage between terminals 11 and 13 is nominally +24 volts and the output voltage across the load can vary within the range from +24 to +26 volts, there is a very small, almost negligible, voltage drop across the primary of the transformer 37. Therefore the flux changes very slowly, the current through the primary of the transformer 37 decays very slowly and most of the power supplied to the load 15 is supplied by the input power between the terminals 11 and 13. As the primary current through the transformer 37 decreases to the lower current level $I_1$ of FIG. 3, or 10 amperes, the Hall device 101 will sense this lower current level and produce an output voltage between its terminals 110 and 111 such that the voltage between pin 3 of the comparator 117 and ground is greater than the voltage between pin 2 of the comparator 117 and ground. As discussed before, with a low current level being sensed by the Hall device 101 the resultant low voltage level from output pin 7 of the comparator 117 will not be applied through the diode 125, and the transistor 131 will cut off. The high level output of the transistor 131 is inverted by the inverter 135 to turn on the transistor 139, which in turn turns on the transistor 157, which in turn turns on the transistor 159. The turn-on of the transistor 159 again reverse-biases the diode 21 and allows the current through the primary of the transformer 37 to build back up to the $I_2$ or 12-ampere level, at which time the above sequence repeats itself.

Now in this mechanization, it was postulated that the current required by the load 15 was approximately 2 amperes, while the current that was flowing through the primary of transformer 37 ranged between the $I_1$ and $I_2$ limits of 10 to 12 amperes. It should be obvious that if more current were required by the load 15 the circuitry could be modified by changing the sizes of the components to achieve operation at currents other than those discussed above. At the time that the transistor 159 is turned off, the current flowing through the primary of the transformer 37 has reached the 12-ampere limit and shortly thereafter the magnetic field built up around the primary of transformer 37 collapses and causes this current to flow through the diode 21 and to the load 15 and to the capacitor 25. Since the load only requires 2 amperes of current the excess in current is used to charge the capacitor 25. In a sense the transformer 37 is supplying current faster than the load can absorb it. As a result, the voltage across the capacitor 25 starts increasing, thereby increasing the output voltage.

The voltage sensing circuit 27 monitors the output voltage and operates to regulate the output voltage between the approximate limits of 24 and 26 volts. Serially connected resistors 175, 177, and 179 form a voltage divider which is coupled across the load 15 in order to develop a sample of the output voltage across the resistor 179. The voltage sensing for the voltage sensing circuit 27 is done through the resistors 175, 177 and 179 with resistor 179 feeding the sample of the output voltage into input pin 2 of a differential comparator 181. The comparator 181 may be a Fairchild μA710, High Speed Comparator, like the comparator 117. The comparator 181 is protected from damage due to excessively high transient conditions by the zener diode 182, which is connected between ground and the junction of resistors 175 and 177. The diode 182 does not conduct in any normal operation of the circuit. However, under some transient conditions the unregulated input between terminals 11 and 13 may rise to as high as, for example, +90 volts. In this event the diode will start conducting during the period of the excessively high voltage transient condition, thereby preventing damage to the comparator 181.

Pin 3 is the reference input for the differential comparator 181 and is coupled through a network composed of resistors 183 and 184 and zener diode 185 to the +15-volt source. This network provides a fixed voltage reference to pin 3 of the comparator 181. Resistor 183 compensates for the impedance driving the other input on pin 2 of the comparator 181. Resistor 187, which is coupled between the noninverting input pin 2 and output pin 7 of the comparator 181 provides positive feedback for the comparator 181 so as to add hysteresis to the control of the voltage. That is, when the voltage being sensed across the resistor 179 is too high, it exceeds the reference voltage being applied to pin 3 of the comparator 181. The feedback through resistor 187 is such that the output voltage as sensed by resistors 175, 177 and 179 must decrease by some relatively large amount, for example a 2-volt decrease from +26 volts to +24 volts, before pin 2 will again cross over with pin 3 to represent a low voltage condition.

When the output voltage across the capacitor 25 increases to or beyond the +26-volt limit, the voltage on pin 2 will exceed the reference voltage on pin 3 of the comparator 181, thereby causing a high output voltage to be applied from output pin 7 of the comparator 181 through zener diode 189 and resistor 191 to provide the drive to turn on NPN-transistor 193. Resistor 195 is connected between the base of the transistor 193 and ground in order to provide a path for the leakage current in the transistor 193 and to desensitize the transistor 193 to noise pickup. The transistor 193 will conduct whenever the output voltage equals or exceeds the upper voltage limit of +26 volts and continue to conduct until the output voltage has decreased to or below +24 volts at which time the transistor will be cut off.

The conduction of the transistor 193 through the resistor 197, located in the switching circuit 39, furnishes the base drive for PNP-transistor 199, causing transistor 199 to start conducting also. The emitter of the transistor 199 is connected directly to the output while the base is connected through a resistor 201 to the output. Resistor 201 takes care of leakage currents and desensitizes the operation of the transistor 199 for noise purposes. Upon being turned on, the transistor 199 conducts through resistor 203 and through the base-emitter region of transistor 205, at which time the transistor 205 starts conducting. Resistor 207, which is connected between the base and the reference potential, establishes a low impedance across the base-emitter junction of the transistor 205 to provide rapid turnoff. The conduction of the transistor 205 through the diode 164 and the secondary of the transformer 37 completes the path to short out the secondary winding of the transformer 37. The total voltage drop across the secondary winding of the transformer 37 will now be equal to the diode drop across the diode 164 plus the saturated transistor drop across the collector-emitter region of the transistor 205, which will be approximately 1 volt or less.

The reflected impedance of the secondary shorts out the primary of the transformer 37, thereby reverse-biasing the diode 21, which prevents the transformer 37 from supplying additional current to charge the capacitor 25 to a higher voltage.

It should be noted at this point that if the input voltage between the input terminals 11 and 13 is high enough above +24 volts to forward-bias the diode 21, the load current can be supplied directly from the unregulated input between terminals 11 and 13 without the operation of the regulator power supply.

To show how the power supply will regulate the output voltage between +24 and +26 volts when the unregulated input voltage may be somewhere between +6 and +26.7 volts, the worst possible condition will be considered, namely when the input voltage has been reduced to +6 volts by some transient or even on a steady state basis. If at the time the input voltage drops to +6 volts, the output voltage is above +24 volts, and the transistor 205 is conducting, the power supply will remain inoperative until the capacitor 25 has discharged sufficiently through the load 15 to decrease the output voltage to or below the +24 volt lower voltage level. At this time, as previously described, the transistor 205 in the switching circuit 39 becomes nonconducting. The current in the transformer 37 will then be delivered in pulses to the load 15 and capacitor 25 according to the previously discussed operation of the current sensing circuit 41 and the switching circuit 40. It should be recalled that when the transistor 159 is first cut off the current through the primary of the transformer 37 is at 12 amperes, and decreases to 10 amperes as it is supplied to the load 15 and to charge the capacitor 25. When the current through the primary of the transformer 37 has decreased to 10 amperes, the Hall device will produce an output signal which, according to the sequence of operation previously described, will turn on the transistor 159 and allow the current in the primary to build back up to the $I_2$ or 12 ampere level.

Since the output voltage as developed across the capacitor 25 will be maintained at or above the lower voltage limit of +24 volts, the potential at the bottom of the primary of the transformer 37 will be approximately +25 volts. This difference in voltage is required to overcome the diode drop of the diode 21. Since the bottom of the primary of the transformer 37 is at approximately +25 volts and the top of the primary has been dropped to +6 volts by the transient, the current in the primary of the transformer 37 will now decrease because of this reverse-bias across its primary. As the current decreases and reaches the $I_1$ or lower current level of 10 amperes, the Hall device 101 will initiate a sequence of operations, as previously described, to turn on the transistor 159 and cause the bottom of the primary of the transformer 37 to be near the ground potential while the top of the primary of the transformer 37 remains at the +6-volt level. At this time the current through the primary of the transformer 37 will start to increase from the 10- to the 12-ampere level but at a very slow rate, since the input voltage is now at a +6-volt level instead of the nominal +24-volt level. Each time the transistor 159 is turned off a new 12-ampere pulse of current is fed from the primary of the transformer 37 through the diode 21 into the parallel connected load 15 and capacitor 25, with the current excess being used to increase the output voltage developed across the capacitor 25. These 12-ampere pulses of current will cause the output voltage developed across the capacitor 25 to increase until the upper voltage limit of 26 volts is reached or exceeded. When the upper voltage limit is reached, the voltage sensing circuit 27 will operate in conjunction with the switching circuit 39 to turn on the transistor 205 and circulate in the secondary of the transformer 37 the current that had built up there, until the output voltage has decreased to or below the +24-volt level. It should be noted at his time that the ratio of the 12-ampere pulses from the transformer 37 to the 2 amperes required by the load 15 allows for a duty factor small enough to maintain the voltage at the output, even though the period between pulses is relatively long in relation to the pulsewidth of the 12-ampere pulses. When the total flux produced by the current circulating in the primary and secondary windings of the transformer 37 decreases below the level representing 10 amperes of current in the primary of the transformer 37, the current sensing circuit 41 causes the switching circuit 40 to turn on the transistor 159 and replenish the current flowing through the primary of the transformer 37.

At low input voltages of down to +6 volts, the energy stored in the transformer 37 is barely sufficient to replenish the charge on the capacitor 25 between the recharge cycles of the transformer 37. At input voltages above +24.7 volts, the energy is merely circulated for storage in order to be prepared for the time when a transient condition drives the input of the unregulated input voltage down to as low as a +6-volt level.

If the transient condition were such that the input voltage was gradually changed from +26.7 volts down to +6 volts, a circulating current of from 10 to 12 amperes would not be needed. A system could be designed to circulate just 2 to 3 amperes and gradually build up the circulating current to supply a greater and greater charging current to the capacitor 25 as the output voltage decreased. However, in many operations the transient occurs very suddenly, which would cause the output voltage to dip suddenly below the 24-volt level and then gradually recover as the current built up to the 12-ampere level, and then recharged the capacitor 25. In contrast, the system of FIG. 5 circulates a current of from 10 to 12 amperes at all times. As a result, whenever a transient appears between the input terminals 11 and 13 and drops the input voltage to as low as +6 volts, that transient does not appear in the output voltage at all because of the ready availability of the charging current to maintain the output voltage developed by the capacitor 25 between the limits of +24 to +26 volts at all times.

Noncompensated zener diodes such as zener diodes 109, 147 and 185 have been used in FIG. 5, since the voltage and sensing functions are only required to be crude for the particular application for which the power supply of FIG. 5 was first used. If, for some reason, very precise voltage and current sensing were required, then the diodes 109, 147, 185 and some of the other zener diodes could be replaced with compensated precision zener diodes.

In accordance with the teachings of the invention as previously described, it is to be noted that if the anode of the diode 21 were connected to the junction of the secondary of the transformer 37 and the anode of the diode 164 instead of to the junction of the primaries of the transformers 37 and 161, the power supply could achieve output voltage regulation for input voltage levels higher or lower than the output voltage level.

Figure 6:
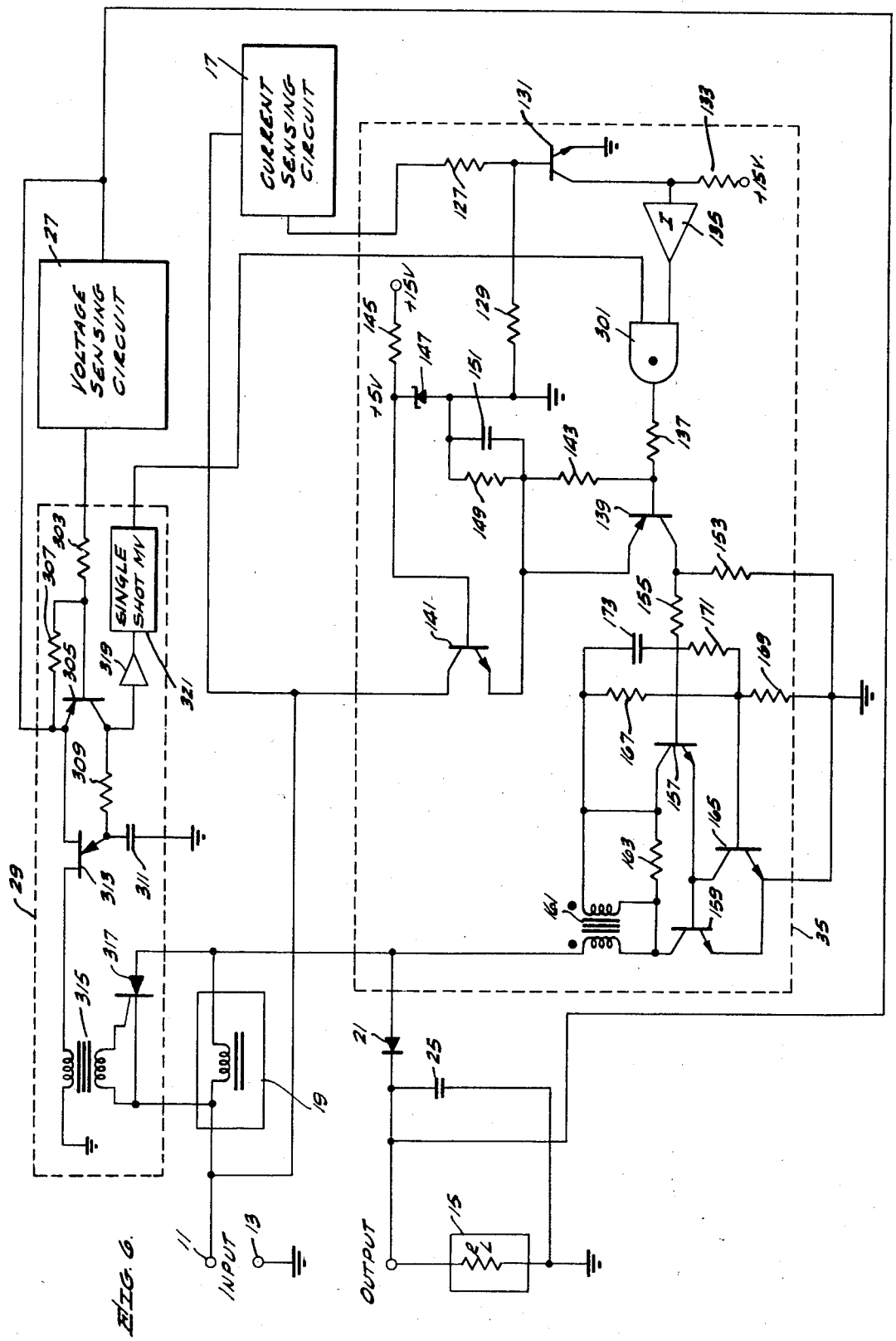
FIG. 6 is a schematic block circuit diagram of the power supply of FIG. 1.

Now referring to FIG. 6, the mechanization of the embodiment of FIG. 1 is shown. In this embodiment the voltage sensing circuit 27 and the current sensing circuit 17 are basically identical in structure, function and operation to those (27 and 41, respectively) illustrated and described in relation to FIG. 5 and therefore will not be discussed in detail. In this embodiment the inductor 19 is used instead of the transformer 37 and the switching circuits 29 and 35 are designed differently than their respective switching circuits 39 and 40 in FIG. 5. In this embodiment the Hall device FIG. 5) in the current sensing circuit 17 is inserted in the core of the inductor 19 in order to sense the ampere-turns and hence when the current through the inductor 19 has decreased to or below the $I_1$ or 10-ampere level, or increased to or above the $I_2$ or 12-ampere level, and accordingly, control the operation of the switching circuit 35. The structure and operation of the switching circuit 35 are identical to those of the switching circuit 40 of FIG. 5 with the exception of the addition of a two-input AND-gate 301. One of the inputs of the AND-gate 301 is connected to the output of the inverter 135, while the output of the AND-gate 301 is coupled to the resistor 137. The other input to the AND-gate 301 is coupled to the switching circuit 29. Whenever both inputs to the AND-gate 301 are in a "one" state or high voltage level, the AND-gate 301 produces a high voltage or "one" state output, which causes the transistor 159 to be turned off. The lower input to the AND-gate 301 is put in a "one" state when the current sensing circuit 17 senses that the current through the inductor 19 has reached or exceeded the upper current level $I_2$ of 12 amperes. The time of and reason for placing a "zero" state voltage signal on the upper part of the AND-gate 301 will be discussed later. When the output of the AND-gate 301 is in the "zero" state or low voltage level, as when the current sensing circuit 17 senses that the current flowing through the inductor 19 is at or below the low current level $I_1$ of 12 amperes, the transistor 159 is turned on so that the current through the inductor 19 can build back to the 12-ampere level.

When the output voltage across the capacitor 25 reaches or exceeds the upper voltage limit $E_2$ of +26 volts, the voltage sensing circuit 27 produces a "zero" state or a low voltage output which is applied through the resistor 303 to the base of NPN-transistor 305, causing the transistor 305 to start conducting. The emitter of the transistor 305 is connected directly to the output of the power supply and through a resistor 307 to the base of the transistor 305. Resistor 307 takes care of leakage currents and desensitizes the operation of the transistor 305 for noise purposes. Upon being turned on, the transistor 305 conducts through resistor 309 and capacitor 311 to ground, causing the voltage across the capacitor 311 to increase. The junction of the resistor 309 and capacitor 311 is connected to the emitter of a unijunction transistor 313 which has one of its bases connected to the emitter of the transistor 305 and the other base coupled through the primary of a transformer 315 to ground. The unijunction transistor 313, the resistor 309 and the capacitor 311 comprise a sawtooth generator. As is well known in the art, when the voltage across the capacitor 311 has increased to a level above the voltage gradient opposite the P-type material in the unijunction transistor 313, the PN-junction thereof will be forward-biased and start conducting which will rapidly discharge the capacitor 311 thereby cutting off the unijunction transistor 313, and the cycle will repeat. Each time the unijunction transistor 313 is turned on a pulse of current is drawn through the primary of the transformer 315. As a result, a train of pulses at a fairly high repetition rate is coupled into the secondary winding of the transformer 315, which is coupled between the gate and cathode electrodes of a silicon controlled rectifier (SCR) 317. The cathode-anode region of the SCR 317 is coupled across the inductor 19 with the cathode being connected to the input terminal 11. The train of pulses is supplied from the unijunction transistor circuit in order to assure that the SCR 317 will trigger, if not on the first pulse, then on some subsequent pulse. As a result, under high voltage conditions as sensed by the voltage sensing circuit 27, the SCR 317 is gated on by this train of pulses in order to provide a short across the inductor 19 so that the current can circulate therethrough until the current is needed to charge the capacitor 25 again. It should be noted that the cathode of the SCR 317 is connected to the input terminal 11 so that when the transistor 159 is turned on under low current conditions, the anode of the SCR 317 is at a low potential thereby back-biasing the SCR 317 and preventing its conduction.

A serially coupled inverter 319 and 10-microsecond single-shot multivibrator 321 are coupled between the collector of the PNP-transistor 305 and the second input to the AND-gate 301. With a decrease in the output voltage to or below the +24-volt level, the voltage sensing circuit produces a high output which turns off the transistor 305, causing its collector to go to a low voltage state. This low voltage state from the collector of the transistor 305 is inverted by inverter 319 and the resultant inverted pulse is used to trigger the single-shot multivibrator 321. The multivibrator 321 then supplies a negative or zero state pulse of 10 microseconds in duration to the AND-circuit 301, thereby initiating the sequence of operation previously discussed in order to turn on the transistor 159. This zero state or low output voltage from the single-shot multivibrator 321 is applied to the AND-gate 301 and used to turn on transistor 159. When the transistor 159 turns on, it reverse-biases the SCR 317, thereby removing the short across the inductor 19 and allowing the current through the inductor 19 to be used to recharge the capacitor 25 to increase the output voltage.

In the embodiments shown in FIGS. 5 and 6 it is possible to eliminate the Hall device and to replace it with some other form of current sensing. In both embodiments the operation of the comparator 117 must have a sufficiently large input common-mode dynamic range to accommodate input transient signals from the input terminal 11, which can be at voltages between +6 and +90 volts, for example. In this event, the Hall device 101 and its associated circuitry consisting of transistor 103, resistors 105 and 107 and zener diode 109, can be replaced with current sensing resistor circuitry.

Figure 7:
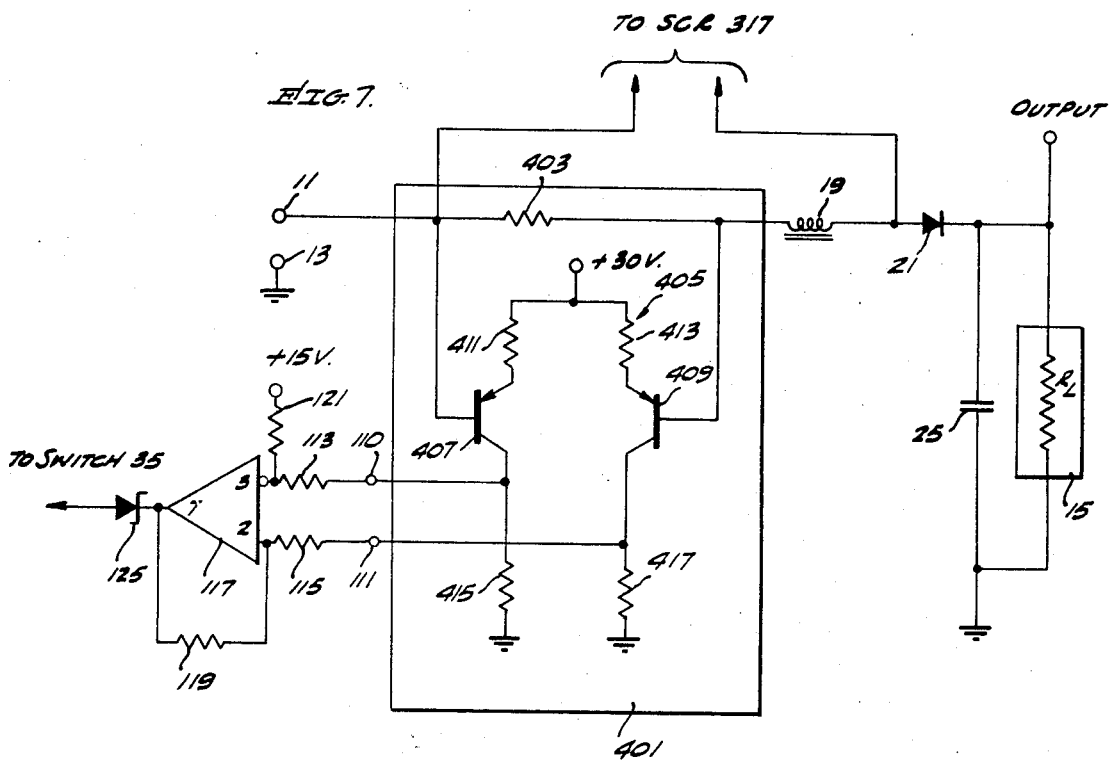
FIGS. 7 and 8 show a different type of current sensing circuit which may be used in the embodiments of FIGS. 6 and 5, respectively.

FIG. 7 reveals the modification for the embodiment of FIG. 6 wherein a different type of current sensing is utilized. The current sensing circuit 17 (see current sensing circuit 41 of FIG. 5) is modified by eliminating the Hall device 101, the transistor 103, the zener diode 109 and the resistors 105 and 107 and adding the current sensing resistor circuitry 401, as shown. The remaining components of FIG. 7 have been previously described in relation to FIG. 6. A current sensing resistor 403 is serially connected between the input terminal 11, and the inductor 19 to develop a voltage thereacross which has an amplitude proportional to the amplitude of the current flowing through the inductor 19. The resistor 403 may be, for example, 10 milliohms in size.

A differential amplifier 405, comprising the transistors 407 and 409 and the resistors 411, 413, 415 and 417, is coupled across the sensing resistor 403 in order to translate the DC level across the sensing resistor 403 to ground. Since the unregulated DC input voltage at input terminal 11 may vary from +6 volts to +90 volts, for example, with respect to ground, the voltage on each side of the resistor 403 will also vary at substantially these same levels. The translation of the voltage at these levels is necessary in order to protect the comparator 117 from damage.

Assume at this time that the input voltage at terminal 11 is at a nominal +24 volts and the output voltage is at +25 volts and the switch 35 is closed to allow the current through the inductor 19 to increase from the $I_1$ level to the $I_2$ level. As the current in the inductor 19 builds up from 10 to 12 amperes, the voltage drop across the serially connected resistor 403 changes from 100 to 120 millivolts, with the side of the resistor 403 connected to terminal 11 being positive with respect to the other side of the resistor. Since both of the transistors 407 and 409 are forward-biased at this time, the transistor 409 will conduct via the resistors 413 and 417 to ground and the transistor 407 will conduct via the resistors 411 and 415 to ground. However, the transistor 409 will conduct more heavily than the transistor 407 since its forward-bias is greater than that of the transistor 407. As a result the voltage developed across the resistor 417 will be greater than that developed across the resistor 415. The voltage developed across the resistor 417 is applied via terminal 111 and resistor 115 to input pin 2 of the comparator 117 while the voltage developed across the resistor 415 is applied via terminal 110 and resistor 113 to input pin 3 of the comparator 117. When the current flowing through the resistor 403 and the inductor 19 has reached the $I_2$ level of 12 amperes, the voltage applied to pin 2 of the comparator 117 will exceed the voltage applied to pin 3 and the crossover point will be reached. Therefore the voltage at output pin 7 of the comparator 117 will become sufficiently high to cause the zener diode 125 to conduct which, as previously explained, will cause the switch 35 to be turned off to prevent the current from further increasing.

In a like manner, when the current through the inductor 19 has decreased to the $I_1$ level of 10 amperes, the voltage at pin 3 will exceed the voltage at pin 2 of the comparator 117 and cause the voltage at output pin 7 of the comparator 117 to initiate the sequence of operation, previously described, to turn on the switch 35 to allow the current to build back up to the $I_2$ level.

Figure 8:
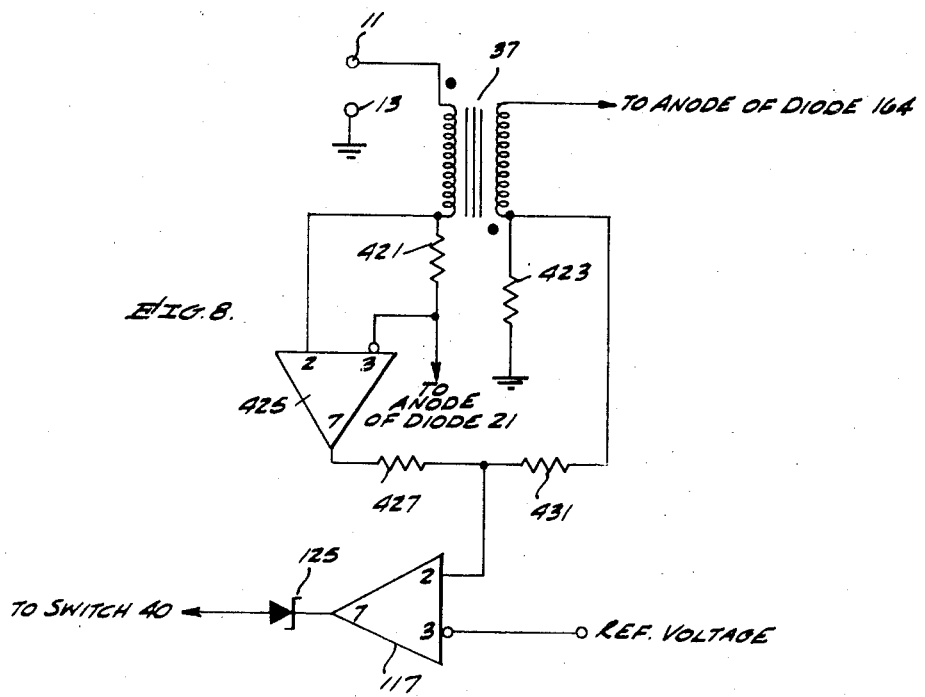

FIG. 8 shows how the embodiment of FIG. 5 can be modified to replace the Hall device 101 with sensing resistors. Sensing resistors 421 and 423 are respectively placed in series with the primary and secondary windings of the transformer 37. Each of these resistors 421 and 423 senses the current in its respective winding by developing a voltage across its respective resistance in proportion to the current flowing therethrough. A differential amplifier or comparator 425, similar to the comparator 117, has its input pins 2 and 3 connected across the resistor 421 while its output pin 7 is coupled through resistor 427 to pin 2 of the comparator 117. The comparator 425 develops an output signal related to the differential signal developed across the resistor 421. The voltage developed by the resistor 423 is applied through resistor 431 to pin 2 of the comparator 117. The resistors 427 and 431 are connected together to form a summation network for summing the output voltage of the comparator 425 with the voltage developed across the resistor 423 and applying the sum to pin 2 of the comparator 117. The other input to the comparator 117 is a reference voltage which is applied to inverting input pin 3 in order to establish the crossover point for the operation of the comparator 117. The output signal of the comparator 117 is applied to the zener diode 125 for subsequent control of the switching circuit 40, as previously described.

Figure 9:
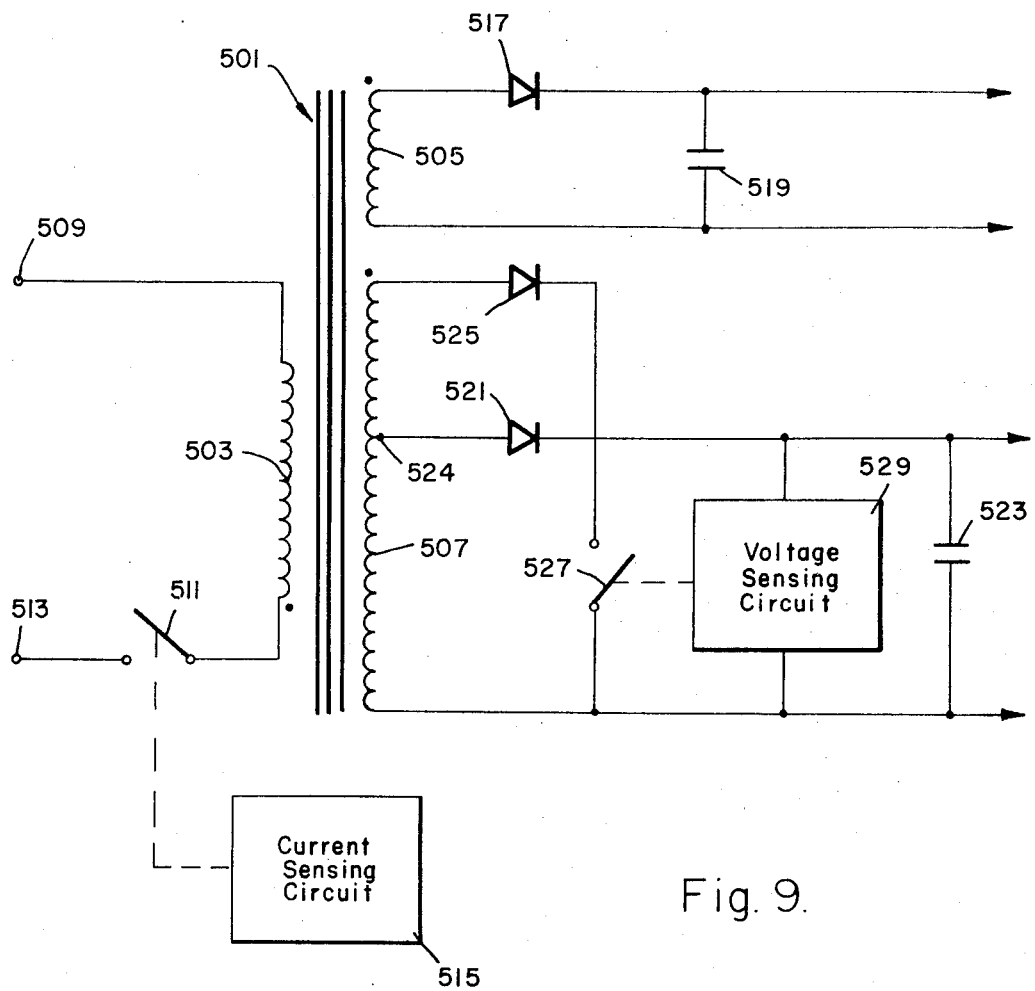
FIG. 9 is a schematic circuit and block diagram of the regulated power supply in accordance with a third embodiment of this invention.

Referring now to FIG. 9, a third embodiment of the invention is illustrated. In this embodiment a transformer 501 is utilized which has a primary winding 503 and secondary windings 505 and 507. With respect to the primary winding 503, the secondary windings 505 and 507 are respectively illustrated to have stepdown and step-up turns ratios. Furthermore, as indicated by the dots adjacent to the windings, the upper side of each of the secondary windings 505 and 507 has the same phase relationship as the lower side of the primary winding 503. The upper side of the primary winding 503 is connected to an input terminal 509 and the lower side of the winding 503 is coupled through a switch or switching circuit 511, corresponding to the switch 40 in FIG. 4, to another input terminal 513 for receiving an unregulated DC input voltage from the terminals 509 and 513.

A flux or current sensing circuit 515, similar to the current sensing circuit 41 in FIG. 4, senses the flux in the core of the transformer 501. The flux in the transformer core is proportional to the total ampere turns on the transformer 501. The output of this current sensing circuit 515 controls the operation of the switch 511 by closing the switch 511 when the flux being sensed is too low and by opening the switch 511 when the flux is too high. Thus the current sensing circuit 515 maintains the transformer ampere turns between predetermined upper and lower limits. The lower flux or ampere turn limit, as sensed by the current sensing circuit 515, is chosen such that with the application of a minimum input voltage when the switch 511 is closed, the total input power in the primary winding 503 will exceed the total output power of the voltage regulator by a factor greater than or equal to the reciprocal of the efficiency times the reciprocal of the maximum duty factor of the switch 511.

A serially coupled diode 517 and capacitor 519 combination is coupled across the secondary winding 505 in order to provide an output regulated DC voltage across the capacitor 519. The other secondary winding 507 has a serially coupled diode 521 and capacitor 523 combination coupled between a tap 524 on the winding 507 and the lower side of the winding 507 in order to provide an output regulated DC voltage across the capacitor 523 at a higher voltage level than the output voltage developed across the capacitor 519. A diode 525 is coupled in series with a switch or switching circuit 527, similar to the switch 39 in FIG. 4, with the combination thereof connected across the entire secondary winding 507 in order to provide a loop for storing current when the regulated output voltage across the capacitor 523 is between predetermined minimum and maximum voltage levels. A voltage sensing circuit 529, similar to the voltage sensing circuit 27, is coupled across the capacitor 523 in order to sense the output voltage thereacross. This voltage sensing circuit 529 controls the operation of the switch 527 in response to the sensed output voltage across the capacitor 523, similar to the manner in which the voltage sensing circuit 27 controlled the operation of the switch 29 in FIG. 1.

In initial operation when the unregulated input voltage is first applied to the input terminals 509 and 513, the current sensing circuit 515 senses that the flux in the core of the transformer 501 is low and therefore causes the switch 511 to close. In addition, the voltage sensing circuit 529 causes the switch 527 to be open due to the low voltage output across the capacitor 523. With the switch 511 closed, current starts flowing through the primary winding 503 at a time rate determined by the inductance of the primary winding 503, thereby building up the flux in the core of the transformer 501. During the time that the flux is building up, no power is being delivered from the input directly to the outputs, since the diodes 517 and 521, as well as the diode 525, are reverse-biased, thereby preventing the capacitors 519 and 523 from charging. Since the number of turns in the primary and secondary windings is fixed, the increase in current flowing through the primary winding 503 causes the ampere turns on the transformer 501 to increase. This increase in the ampere turns causes the flux in the transformer core to increase until the current sensing circuit 515 senses that the flux in the transformer 501 has reached the upper limit, at which time the current sensing circuit 515 opens the switch 511. The opening of the switch 511 causes the magnetic field or flux that had been built up in the core of the transformer 501 to start collapsing, thereby inducing across the secondary windings 505 and 507 voltages which forward-bias the diodes 517 and 521. The diode 525 is not forward-biased at this time since the switch 527 is still open. At the instant of time that the switch 511 is opened, the total number of ampere turns on the transformer 501 cannot change. Since the opening of the switch 511 reduces the primary ampere turns to zero, the number of ampere turns in the secondary windings immediately after the opening of the switch 511 must be equal to the number of ampere turns in the primary winding 503 immediately before the opening of the switch 511. As a result, the accumulation of ampere turns in the secondary windings 505 and 507 results in a current flowing from the lower portion of the secondary winding 507 through the tap 524 and the forward-biased diode 521 to charge the capacitor 523 and to deliver power to the load (not shown) associated therewith. Also, current flows from the secondary winding 505 through the forward-biased diode 517 to charge the capacitor 519 and provide power to the load (not shown) associated therewith.

In the event that the voltage across the capacitor 523 does not reach the upper voltage level, as sensed by the voltage sensing circuit 529, before the flux in the core of the transformer 501 has decreased to the lower flux limit, as sensed by the current sensing circuit 515, the switch 511 will again be closed. The closure of the switch 511 allows current to flow in the primary winding 503 to build the flux back up to the upper flux limit, at which time the current sensing circuit 515 will again open the switch 511, thereby causing current flow in the secondary windings 505 and 507 to continue charging the respective capacitors 519 and 523.

When the voltage across the capacitor 523 has increased to the upper voltage level, the voltage sensing circuit 529 closes the switch 527, thus allowing current to circulate in the entire secondary winding 507 through the diode 525 and closed switch 527 as long as the switch 511 is open. The capacitors 523 and 519 then slowly discharge through their respective loads in order to provide power to these loads. It should be noted at this time that the voltage sensing circuit 529 is coupled across that output (consisting of the capacitor 523 and its associated load) which operationally has a more rapid decay (percentagewise) in output voltage with respect to time than any other output. Only one other output, consisting of the capacitor 519 and its associated load, is illustrated. However, it should be realized that more than two secondary windings can be utilized in conformance with the teachings herein presented. Therefore, due to its load requirements the capacitor 523 will discharge more rapidly than the capacitor 519. When the capacitor 523 has discharged down to the lower voltage level, the voltage sensing circuit 529 will open the switch 527, thereby allowing the current that had been circulating through the entire secondary winding 507 to be utilized, whenever the switch 511 is open, to recharge the capacitor 523. Since (1) the multiple output voltages across the capacitors 523 and 519 are limited in amplitude by the respective turns ratios of the lower portion of the secondary winding 507 and the secondary winding 505 to the primary winding 503 and (2) the sensed output across the capacitor 523 was designed for the highest percentage discharge rate, the lower portion of the secondary winding 507 will initially receive all of the circulating current to recharge the capacitor 523, after which the output across the capacitor 519 will be recharged. This sequential recharging of the two illustrated outputs (and such additional outputs across additional secondary windings as may be required) will be such that when the switch 527 is again closed or turned on, all outputs will be at their respective desired voltages.

The operation of the voltage regulator of this third embodiment is similar to the four states of operation of the embodiment of FIG. 1. Briefly, when the switch 511 is closed to increase the flux in the core of the transformer 501, it doesn't matter whether the switch 527 is open or closed since all of the diodes 517, 525 and 521 are reverse-biased. When the switch 511 is open and the switch 527 is closed, current is being circulated in the secondary winding 507. When the switches 511 and 527 are both open, the circulating current in the secondary winding 507 is used to recharge the capacitor 523 to the upper voltage level, and the capacitor 519 is also charged through the secondary winding 505. When the voltage across the capacitor 523 has increased to the upper voltage level, the voltage sensing circuit 529 closes the switch 527, enabling current to be circulated through the entire secondary winding 507 as long as the switch 511 is open. The output voltage levels, as sensed by the voltage sensing circuit 529 across the capacitor 523, can be set arbitrarily close together, depending upon how high a switching frequency can be tolerated by the power supply or how high a ripple amplitude can be tolerated by the load.

Care should be taken that the number of turns across the secondary winding 507 is such that the induced voltage across the entire secondary winding 507 does not exceed the breakdown voltage of the switch 527 when the other output voltages are within their normal regulated ranges. However, the higher the voltage induced in the secondary winding 507, the smaller the current that has to circulate through the secondary winding 507 in order to keep the same number of ampere turns that is operationally required. The tap on the secondary winding 507 is positioned to that point along the secondary winding which will allow the desired output voltage to be developed across the capacitor 523.

It should be further noted that other flux or current sensing devices may be used in lieu of the current sensing circuit 515, which as specified before may be similar to the current sensing circuit 41 in FIG. 4. For example, circuitry similar to that shown in FIG. 8, may be used to sample the current flow in all of the windings of the transformer 501 in order to determine the total flux in the core of the transformer 501.

The invention thus provides, in one embodiment, a regulated power supply system for supplying to a load a relatively constant direct current output voltage which is at a voltage level equal to or greater than that supplied from a variable DC source. In another embodiment a multiplicity of different regulated output voltages are derived, each being isolated from the unregulated input voltage. The system stores a circulating current, which is maintained at a level within a predetermined range, until it is needed to increase the output voltage from a first to a second predetermined level. After the circulating current has increased the output voltage to the second predetermined level, the current is stored until needed again. The wide effective bandwidth of the power supply eliminates a transient effect on the output voltage for any transient change of input voltage within the dynamic range of the power supply.

While the salient features have been illustrated and described with respect to three particular embodiments, it should be readily apparent to those skilled in the art that modifications can be made within the spirit and scope of the invention as set forth in the appended claims.

What is claimed is:

1. A power supply for supplying regulated power to a load comprising:

current generator means, coupled to the load and adapted to receive an input unregulated voltage, for supplying a current at least equal in amplitude to the maximum current required by the load;

input means coupled to said current generator means for sensing the current through said current generator means, said input means being responsive to current at a lower current level through said current generator means for providing a path for the current through said current generator means to increase to an upper current level, said input means being responsive to current at the upper current level through said current generator means for coupling said current generator means to the load to allow said current generator means to increase the output voltage as needed;

output means, coupled to said current generator means and to the load, for sensing the amplitude of the output voltage across the load, said output means being responsive to the upper voltage level of the sensed output voltage for preventing said current generator means from supplying current to the load, said output means being responsive to the lower voltage level of the sensed output voltage for allowing said current generator means to supply a current to the load, said output means including:

a capacitor coupled across the load and being responsive to the current supplied by said current generator means for developing the output voltage for the load;

a voltage sensing circuit coupled to the load for sensing the amplitude of the output voltage developed across said capacitor; and a first switching circuit coupled to said current generator means and being controlled by said voltage sensing circuit to close when the output voltage has increased to at least the upper voltage level and to open when the output voltage has decreased to at least the lower voltage level, said current generator means being bypassed back to itself through the closure of said first switching circuit by said voltage sensing circuit when the output voltage has increased to at least the upper voltage level in order to prevent said capacitor from charging to a higher output voltage.

2. The power supply of claim 1 wherein said input means includes:

a current sensing circuit coupled to said current generator means for sensing the amplitude of the current through said current generator means;

a second switching circuit coupled to said current generator means and said voltage sensing circuit and being controlled by said current sensing circuit to close and provide a path for increasing the current through said current generator means when the current through said current generator means has decreased to at least the lower current level and to open when the current through said current generator means has increased to at least the upper current level; and diode means coupled between said second switching circuit and the load and having conductive and nonconductive states, said diode means being in the conductive state to allow current from said current generator means to pass therethrough to charge said capacitor to a higher output voltage when said second switching circuit is open, said diode means being in a nonconductive state to prevent said capacitor from discharging through said second switching circuit when said second switching circuit is closed.

3. The power supply of claim 2 wherein the current flowing through said current generator means produces a magnetic field having a strength proportional to the amplitude of the current therethrough and said current sensing circuit includes:
a device placed in the magnetic field of said current generator means to sense the strength of the magnetic field in order to develop a first voltage having an amplitude proportional to the amplitude of the current flowing through said current generator means; and
amplifier means coupled between said device and said second switching circuit and being responsive to the first voltage of said device for developing a signal to close said second switching circuit when the current through said current generator means has decreased to at least the lower current level and to open said second switching circuit when the current through said current generator means has increased to at least the upper current level.

4. The power supply of claim 3 wherein said current generator means is an inductor.

5. The power supply of claim 3 wherein said current generator means is a transformer having a primary winding and a secondary winding, said primary winding coupled to said second switching circuit and said secondary winding coupled to said first switching circuit, said device being inserted in the magnetic field produced by current flowing through said primary and secondary windings of said transformer in order to sense the total strength of said magnetic field and control said second switching circuit as a function of the total magnetic field being sensed.

6. The power supply of claim 2 wherein said current generator means is an inductor and said current sensing circuit includes:
a sensing resistor coupled in series with said inductor;
a differential amplifier coupled across said sensing resistor for developing an output voltage proportional to the amplitude of current flowing through said inductor; and
amplifier means coupled between the output of said differential amplifier and said second switching circuit and being responsive to the output of said differential amplifier for developing a signal to close said second switching circuit when the current through said inductor has decreased to at least the lower current level and to open said second switching circuit when the current through said inductor has increased to at least the upper current level.

7. The power supply of claim 2 wherein:
said current generator means includes a transformer having a primary winding and a secondary winding, said primary winding coupled to said second switching circuit and said secondary winding coupled to said first switching circuit; and
said current sensing circuit includes first and second sensing resistors serially coupled to said primary and secondary windings respectively for respectively developing voltages indicative of the amplitudes of currents flowing through said primary and secondary windings, first and second differential amplifier circuits each having input and output circuits, said input circuit of said first differential amplifier circuit being coupled across said first sensing resistor to develop a first voltage related to the amplitude of the current flowing through said primary winding, first means coupled to the output of said first differential amplifier and to said second sensing resistor for developing a second voltage related to the amplitude of the total current flowing through said primary and secondary windings, said input circuit of said second differential amplifier being adapted to receive a reference voltage and the second voltage in order to develop a third voltage for controlling the operation of said second switching circuit.

8. A regulated power supply comprising:
first storage means for storing voltage;
second storage means for storing current;
first circuit means coupled to said first storage means for sensing the amplitude of voltage stored by said first storage means;
first switching circuit means coupled to said second storage means and controlled by said first circuit means to allow the stored current to be used to increase the amplitude of the stored voltage when the stored voltage has decreased to at least a lower voltage level and to prevent the stored current from being used to further increase the amplitude of the stored voltage when the stored voltage has increased to at least an upper voltage level;
second circuit means coupled to said second storage means for sensing the amplitude of the current stored by said second storage means; and
second switching circuit means coupled to said second storage means and controlled by said second circuit means for selectively allowing the amplitude of the current in said second storage means to be maintained within first and second predetermined current limits.

9. A power supply for supplying regulated power to a load comprising:
current generator means, coupled to the load and adapted to receive an input unregulated voltage, for supplying a current at least equal in amplitude to the maximum current required by the load;
a capacitor coupled to said current generator means and across the load and being responsive to the current supplied by said current generator means for developing the output voltage for the load;
a voltage sensing circuit coupled to the load for sensing the amplitude of the output voltage developed across said capacitor;
a first switching circuit coupled to said current generator means and being controlled by said voltage sensing circuit to close when the output voltage has increased to at least the upper voltage level and to open when the output voltage has decreased to at least the lower voltage level, said current generator means being bypassed back to itself through the closure of said first switching circuit by said voltage sensing circuit when the output voltage has increased to at least the upper voltage level in order to prevent said capacitor from charging to a higher output voltage;
a current sensing circuit coupled to said current generator means for sensing the amplitude of the current through said current generator means;
a second switching circuit coupled to said current generator means, said second switching circuit being controlled by said current sensing circuit to close and provide a path to increase the amplitude of current through said current generator means when the current through said current generator means has decreased to at least the lower current level and to open when the current through said current generator means has increased to at least the upper current level; and
diode means coupled between said current generator means and the load for allowing current from said current generator means to charge said capacitor to a higher output voltage when said first and second switching circuits are open.

10. The power supply of claim 9 wherein:
said current generator means includes a transformer having a primary winding and a secondary winding, said primary winding coupled to said second switching circuit and said secondary winding coupled to said first switching circuit; and
said current sensing circuit includes first and second sensing resistors serially coupled to said primary and secondary windings respectively for respectively developing voltages indicative of the amplitudes of currents flowing through said primary and secondary windings, first and second differential amplifier circuits each having input and output circuits, said input circuit of said first differential amplifier circuit being coupled across said first sensing resistor to develop a first voltage related to the amplitude of the current flowing through said primary winding, first means coupled to the output of said first differential amplifier and to said second sensing resistor for developing a second voltage related to the amplitude of the total current flowing through said primary and secondary windings, said input circuit of said second differential amplifier being adapted to receive a reference voltage and the second voltage in order to develop a third voltage for controlling the operation of said second switching circuit.

11. The power supply of claim 9 wherein the currents flowing through said current generator means produces a magnetic field having a strength proportional to the amplitudes of the currents therethrough and said current sensing circuit includes:

a device placed in the magnetic field of said current generator means to sense the strength of the magnetic field in order to develop a first voltage having an amplitude proportional to the amplitudes of the currents flowing through said current generator means; and amplifier means coupled between said device and said second switching circuit and being responsive to the first voltage of said device for developing a signal to close said second switching circuit when the currents through said current generator means has decreased to at least the lower current level and to open said second switching circuit when the currents through said current generator means has increased to at least the upper current level.

12. The power supply of claim 11 wherein said current generator means is a transformer having a primary winding and secondary winding means for receiving energy from said primary winding, said primary winding coupled to said second switching circuit and said secondary winding means coupled to said first switching circuit, said device being inserted in the magnetic field produced by current flowing through said primary winding and said secondary winding means of said transformer in order to sense the total strength of said magnetic field and control said second switching circuit as a function of the total magnetic field being sensed.

* * * * *